United States Patent [19]

Gustafson

[11] Patent Number: 4,639,900
[45] Date of Patent: Jan. 27, 1987

[54] METHOD AND A SYSTEM FOR MONITORING A SEA AREA

[75] Inventor: Bengt G. Gustafson, Sigtuna, Sweden

[73] Assignee: U.S. Philips Corporation, New York, N.Y.

[21] Appl. No.: 582,424

[22] Filed: Feb. 22, 1984

[51] Int. Cl.$^4$ ............................ G01S 3/80; G01S 3/02
[52] U.S. Cl. ........................................... 367/5; 367/3; 367/128
[58] Field of Search ...................... 367/127, 128, 3, 5, 367/76–79; 343/463–465, 450

[56] References Cited

U.S. PATENT DOCUMENTS

| | | | |
|---|---|---|---|
| 2,433,283 | 12/1947 | Luck | 343/450 |
| 3,723,960 | 3/1973 | Harris | 367/127 |
| 3,881,166 | 4/1975 | Fort et al. | 367/79 |
| 4,086,504 | 4/1978 | Ezell | 367/77 |

Primary Examiner—Richard A. Farley
Assistant Examiner—Daniel T. Pihulic
Attorney, Agent, or Firm—Thomas A. Briody; William J. Streeter; Leroy Eason

[57] ABSTRACT

Three or more listening devices (A1, A2, A3) are dispersed over the water area where the location of a sound source is to be determined, and transmit radio signals over respective channels to a master station upon detecting sound. The master station correlates the signals from selected ones of the listening devices to derive the position of the sound source relative to those listening devices. If the positions of those listening devices are unknown, for example if the devices are floating free, their positions are determined by the master station by comparing the relative times at which an identifying radio signal transmitted by each listening device is received by the master station directly and relayed from each of two stationary radio stations with known positions. The listening devices may also be provided with receivers for receiving radio command signals from the master station, for example relating to activation of certain listening devices and assignment of radio channels.

4 Claims, 5 Drawing Figures

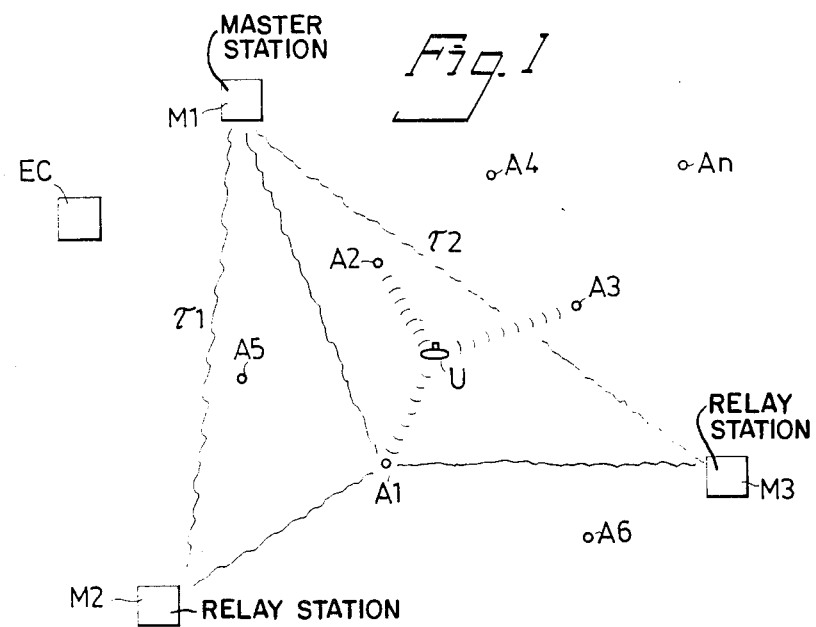
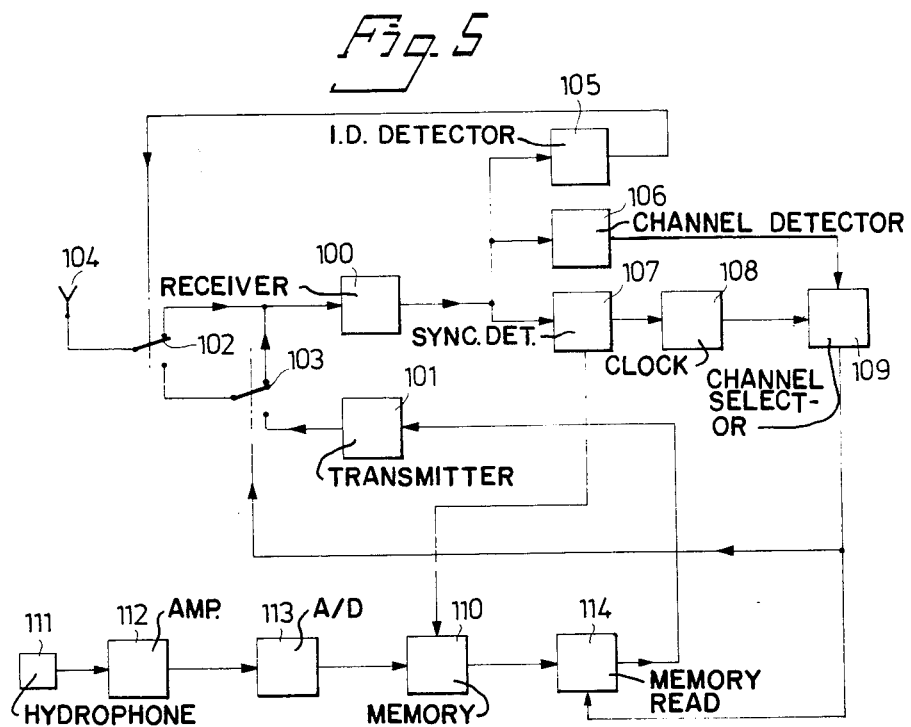

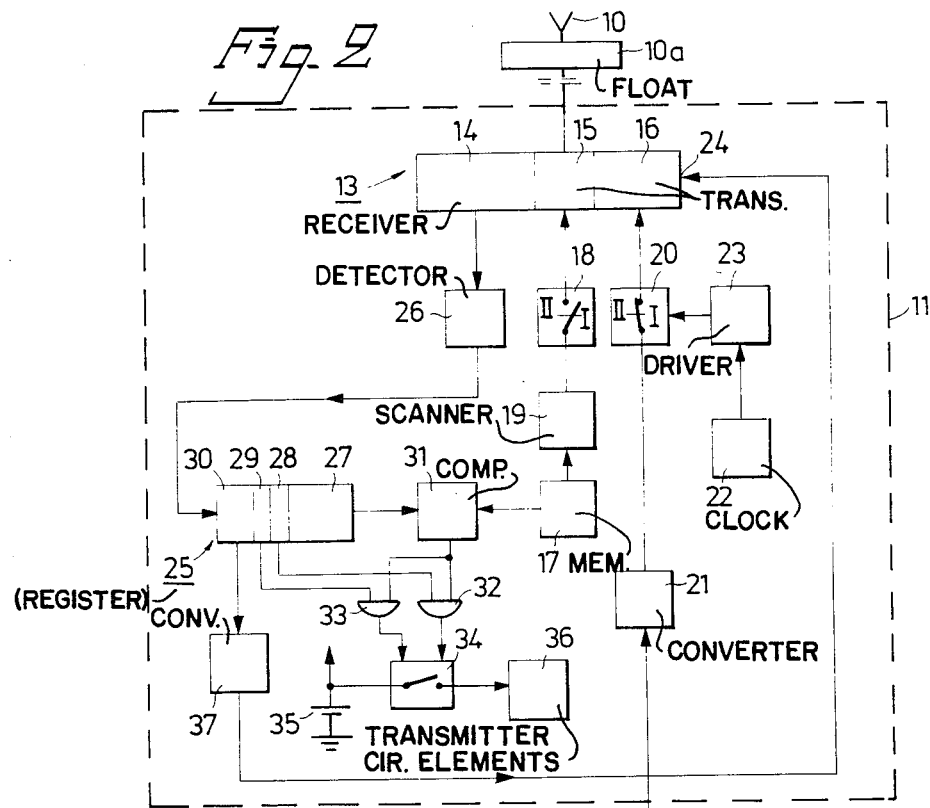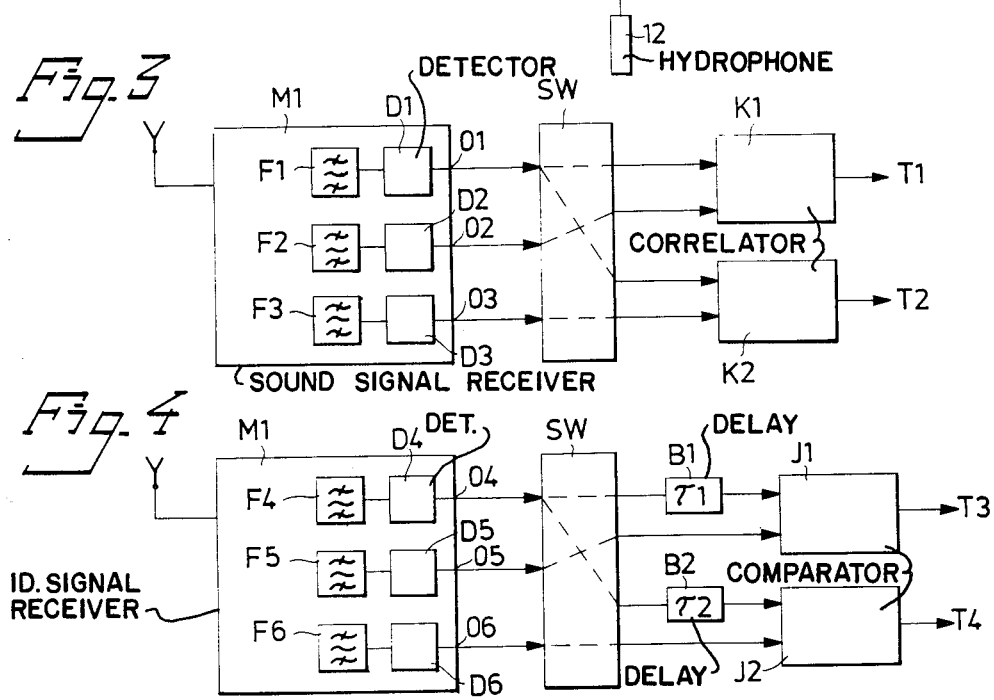

METHOD AND A SYSTEM FOR MONITORING A SEA AREA

BACKGROUND OF THE INVENTION

1. Field of the Invention

The invention relates to a method and system for locating a sound source in a water area by means of hydrophone listening, wherein at least three listening devices are provided each comprising a hydrophone and a radio transmitter with associated antenna and wherein there is further provided one radio master station to which signals indicative of sounds detected by the listening devices are transmitted and which station determines the geographical position of the sound source by correlating the said signals.

2. Description of the Related Art

A method and system for locating a sound source by means of hydrophone listening, which for example is described in U.S. Pat. No. 3,723,960, utilizes three hydrophone transducers connected by a radio link to a master station. The signals received by the master station are correlated in order to identify a common sound source. Then the times of arrival of a discrete sound emanated by the sound source are compared for determining the geographical position of the source. A problem with this system is that the coordinates of the hydrophone transducers must be known to some precision beforehand because, as the position of the sound source is determined with respect to the hydrophone, the precision with which the location of the source can be determined is dependent upon it.

SUMMARY OF THE INVENTION

The object of the invention is to achieve a monitoring of a sea area for discovery and localization of a sound source within that area, which monitoring shall be possible to be used in any sea and which, as compared with known methods, has an improved "endurance" in the sense that it can be maintained for an extended time period with limited effort by qualified persons and with use of simplified and therefore less expensive listening means.

This is achieved by means of a method and system as described in the opening paragraph, wherein according to the invention there are at least two relay stations at geographically known positions. The method comprises the steps of:

the listening devices transmitting, alternatively, signals indicative of the identity of the listening device and of the detected sound of the sound source, said signals being received by the master station and the relay stations;

the relay stations relaying the said received signals to the master station;

the master station processing the part of the said received signals indicative of the identity of the listening devices to establish the geographical position of said listening devices;

the master station determining the geographical position of the sound source with respect to the—in the previous step determined—geographical positions of the said listening devices by correlating the part of the said received signals indicative of the detected sound of the sound source.

By use of the invention monitoring can rapidly be established in each sea area along the coast without use of expensive stationary equipments. Upon indication of unknown objects within a sea area one or more listening devices are placed within the area, whereafter position determination of the sound source takes place by radio transmission from some selected listening devices, which are close to the unknown object. After placing the listening devices in their positions and establishment of required stationary radio stations the monitoring work can in its whole be effected at any one of the radio stations or at a special evaluation center. The monitoring in accordance with the principles of the invention therefore can be effected with a high degree of "endurance". When using a large number of listening devices these devices only need to have a limited range, whereby the listening devices furthermore can be of a simple and cheap construction.

In order to get a sea area under observation rapidly the listening devices can be placed in their positions by means of airplanes or helicopters. It is then suitable to let the listening devices assume arbitrary positions not known beforehand, for example floating freely, in which case according to another feature of the invention the position of each listening device is determined by use of the difference of travel time for radio waves to at least three radio stations having known positions.

A system for locating a sound source in water by means of hydrophone listening comprises at least three listening devices each provided with a hydrophone and a radio transmitter with associated antenna. The system further comprises a radio master station provided with correlator means for determining the position of a sound source by correlating the signals received from the listening devices, and at least two relay stations at geographically known positions for relaying the signals received from the listening devices to the master station. The listening devices comprise switching means for alternatively applying to the transmitter a signal indicative of the identity of the listening device and a signal indicative of the detected sound of the sound source. The master station comprises processing means responsive to the part of the received signal indicating the identity of the listening devices to establish the geographical position of said listening devices.

It is a further object of the invention to control the listening devices for activation or deactivation of the transmitter part, so that the listening device begins to transmit or interrupts transmission of sound information, respectively. Furthermore the control can be arranged to order the actual channel to be used for the transmission, so that each selected listening device can be alotted its own channel. In a system where the listening devices are placed in arbitrary, not known positions, for example floating freely in the sea area, the system according to the invention is characterized in that the listening devices each comprise a radio receiver, the master station comprises transmitting means for the transmission of control information to the listening devices, and the listening devices each comprise activation control means for controlling the selective activation of the listening device in accordance with the control information.

The control or characteristic signal can be of the same kind as the received sound information signals, but due to its low frequency character such a signal is not well suited for localization of the listening devices. In a preferred embodiment the characteristic signal is a special signal, which is transmitted intermittently with constant time intervals during short interruptions in the sound modulated carrier. In order to simultaneously identify the different listening devices the special signal may suitably contain an identification information, so called ID-information, which is individual for each listening device.

BRIEF DESCRIPTION OF THE DRAWINGS

The invention is illustrated in the accompanying drawings, in which

FIG. 1 shows a schematic survey of a monitoring system operating in accordance with the principles of the invention comprising a large number of freely floating listening devices and three stationary radio stations, of which one is master station and the two remaining relay stations, FIG. 2 shows a block diagram for an embodiment of a listening device in a system according to FIG. 1, FIG. 3 shows a simplified diagram of the signal processing part in the master station, which relates to determination of the position of a sound source relative to three selected listening devices, FIG. 4 shows a simplified diagram of the signal processing part in the master station, which relates to determination of the position of a selected listening device, and FIG. 5 shows a block diagram of the circuit of a listening device.

DESCRIPTION OF THE PREFERRED EMBODIMENTS

The monitoring system according to FIG. 1 comprises a number of geographically distributed listening devices A1, A2 ... An, together covering a sea area to be monitored as regards presence of possible sound sources. Such a sound source is shown at U. The distance between the listening devices is adapted to the circumstances and may for example in an archipelago type of area amounting to about 5 kilometers. The listening devices are assumed to be supported by buoys floating freely in the water.

Each listening device comprises a hydrophone and a radio transmitter-receiver with associated antenna. The listening devices are individualized by a special identification address (ID address). An embodiment of a listening device will be described in connection with FIG. 2.

According to FIG. 1 the monitoring system furthermore comprises at least three radio stations M1, M2 and M3, of which M1 is master station and M2 and M3 are relay stations. The radio stations may be stationary equipments but alternatively mobile in the meaning that they can be placed temporarily at different places in connection with a sea area to be monitored. During each measurement the radio stations have fixed and known positions. The master station comprises a transmitter/receiver for transmission of control information to the listening devices and for reception of information signals from these devices and from the relay stations. In the master station there is furthermore signal processing means for carrying out certain signal processing in real time. Via a radio link or in another manner the master station can be in communication with an evaluation center EC, where final signal processing and position determination takes place. The relay stations M2, M3 also comprise transmitter/receiver and are adapted to receive certain signals from the listening devices and to re-transmit them to the master station in different radio channels.

The position determination is in principle effected in the following manner.

It is assumed that only the listening devices A1, A2 and A3, which are in the best position for localization of the sound source U, are active. These listening devices transmit simultaneously and each in its radio channel the detected sound on radio carrier to the master station. In the master station the radio waves are demodulated and the obtained sound waves are correlated two and two. Each correlation results in a time difference, which defines a particular hyperbola of possible locations having that time difference. The sound source is then situated at the crosspoint between the obtained two hyperbolas (in some cases theoretically two crosspoints are obtained, of which, however, one can be excluded as being obviously impossible). In this position determination the difference between the travel time of the different radio carrier waves is not taken into account, because the travel time for sound waves in the water is appreciably longer than the travel time of radio waves in air.

At regular intervals each listening device interrupts its transmission of sound waves and transmits instead its ID-address in a particular radio channel. These ID-addresses are relayed further by the relay stations M2 and M3 in other radio channels. It will be assumed that at a given moment only one listening device, for example A1, is transmitting its ID-address. The master station then receives this ID-address directly from A1 in one radio channel and the same address via M2 in another channel and via M3 in a third channel. As the stations M1, M2 and M3 have known positions the travel times between M2 and M1 ($=\tau 1$) and between M3 and M1 ($=\tau 2$) are known. By correlating the ID-signal obtained directly from A1 with the same ID-signal obtained via M2, with compensation for the known travel time $\tau 1$, a time difference defining a particular hyperbola will be obtained. Similarly, by correlating the ID-signal obtained directly from A1 with the same ID-signal obtained via M3, with compensation for the known travel time $\tau 2$, a time difference defining a second hyperbola is obtained. The cross-point between these hyperbolae establish the location of A1. The listening devices A2 and A3 are localized in the same manner during those intervals in which they are transmitting their ID-signals.

Thus, since the position of the sound source U relative to the listening devices A1, A2, A3 is determined and the position of each one of these devices relative the master station is also determined, full information about the absolute position of the sound source U relative to the master station is available.

In order to elucidate the operation of the system there follows a table showing different kinds of signals appearing in the system, the particular band widths and modulation types being for a specific embodiment described by way of example.

Signal No. 1
Purpose: To transmit the sound of the object which is the source of the sound to listening buoys.
Travel path: Object to at least three selected buoys.
Basic type: Sound waves in water.
Spectrum: 10 Hz or less up to 1000 Hz.
Modulation: Missing. No carrier.

Signal No. 2
Purpose: To enable position determination of the object relative to the selected buoys.

Travel path: From the buoys to a radio receiver on land.
Basic type: Radio waves. Modulated carrier (for example 300 MHz).
Spectrum: Of the order 10 kHz.
Modulation: Sub-carrier, one for each buoy modulated with signal No. 1 on a main carrier.

Signal No. 3
Purpose: To enable position determination of buoy.
Travel path: From actual buoy to at least three radio receivers on land.
Basic type: Radio waves. Modulated carrier (for example 300 MHz).
Spectrum: For example 1-10 MHz.
Modulation: Pulse modulated key signal.
Note: One of the land stations can be master, the signals of the two other receivers being retransmitted to this master.

Signal No. 4
Purpose: Buoy-selective commands; activation and channel selection.
Travel path: From one land station to a buoy (one at a time).
Basic type: Radio waves. Modulated carrier (300 MHz).
Spectrum: Dependent on required command response speed; for example 10 kHz in case of reasonable command speed.
Modulation: Pulse modulated key signal.

Signal No. 5
Purpose: Area selective activation.
Travel path: From three land stations to all buoys within a region specified by the signal.
Basic type: Radio waves. Modulated carrier (for example 300 MHz).
Spectrum: Dependent on desired accuracy at the area-selection; (for example 1-10 MHz).
Modulation: Pulse modulation.

It is evident from the above table that only the signals Nos. 3 and 5 will have a broad band; all other signals have a small spectrum (=band width). The signal No. 5 relating to area-selective activation of the buoys, i.e. activation of all buoys within a selected area, has been included for completeness sake in the above table but will not be discussed further in this specification. As regards signal No. 5 reference is made to published Swedish patent application No. 8301019-9, in which an example of such an area selective activation is described.

FIG. 2 shows a block diagram of a circuit embodiment of a listening device in the shape of a buoy adapted to float free in a sea area to be supervised. The buoy consists of an antenna 10 which is kept floating on the water surface by means of a floating body 10a, and a body 11 the connection cable of which to body 10a has such a length and specific gravity that it floats at a suitable depth below the water surface. At the bottom the buoy is provided with a hydrophone 12 for detecting sound waves or pressure waves in the water.

The body 11 contains the electric circuits included in the listening device, i.e. comprising a transmitter/receiver unit 13 connected to the antenna. This unit is in the drawing illustrated as containing a receiver 14 and two separate transmitters 15 and 16. The transmitter 15 is adapted to transfer identification information to the master station and has an input connected to a memory 17 via a switch 18 and a scanner 19. The memory contains an ID-number which is unique for each listening device, which information is detected and converted to serial form by the scanner 19. The transmitter 16 is adapted to transfer detected sound and has an input connected to the hydrophone 12 via a switch 20 and signal converter 21. The switches 18 and 20 are switched in synchronism between a first position I, in which the switch 20 is closed and the switch 18 is open, and a second position II, in which the switch 18 is closed and 20 is open. Activation of the switches is effected from a clock 22 via a drive stage 23. The time control can be such that the switches normally are in the position I and only for a short time with constant intervals are set to the position II, for example during 10 ms each tenth second. The clock can run somewhat differently in the different buoys in order to prevent several devices from transmitting ID-information simultaneously during any long time period.

The information transfer via the transmitters 15, 16 is effected by modulation of a HF carrier, the transmitter 16 being adapted to transmit in several different channels, while the transmitter 15 has its own channel. The channel used in 16 can be selected by means of a control signal at a control input 24. In reality it is not necessary to have two separate transmitters but a common transmitter can be used, in which case 16 transmits any given channel in this transmitter. The channel separation can be achieved by each channel having its own carrier or its own subcarrier on a common HF-carrier.

The receiver 14, which is also connected to the antenna 10, is adapted to receive control information and has an output connected to a register 25 via a detector 26. The control information can be shaped as a pulse train of HF pulses representing a digital message, the register 25 then can be shaped as a shift register to which this message is fed and stored. As an example of how such a message can be composed, FIG. 2 shows a register 25 consisting of a number of sections. A first section 27 stores a digit sequence representing the ID-number for the listening device to be controlled. This section of the shift register is connected to a comparison device 31, which at a second input receives information from the ID-memory 17. A second section 28 stores a digit representing an activation command and a section 29 stores a digit representing a de-activation command. Finally a section 30 stores a number representing the actual channel to be used. The output of the comparison device 31 is connected to one input of an AND-gate 32 having a second input connected to the section 28 of the shift register 25. The output of the comparison device 31 also leads to one input of an AND-gate 33 having a second input connected to the section 29 of the register 25. The output of the AND-gate 32 leads to a set control input of a controllable switch 34 and the output of the AND-gate 33 leads to the reset control input of the same switch. When a signal is obtained from the AND-gate 32 the switch 34 will be closed for connecting a current source 35 to a block 36 representing those elements in the transmitter part, which require drive voltage. The transmitter then will be activated. In case of signal from the AND-gate 33 the switch 34 will be opened and the transmitter part is deactivated. Those elements in the receiver part, which require drive voltage, are always connected to the current source and the receiver is continuously activated. The last section 30 of the shift register 25 is connected to the control input of the transmitter 16 via a converter 37 adapted to convert the channel digit number in the register 25 to a suitable control voltage for the transmitter.

The operation is as follows.

When a listening device is to be activated the master station transmits a pulse train, the first part of which reaches the section 27 of the listening device shift register 25 and contains the ID-number of the listening device, the second part of which reaches the section 28 and represents the activation command, and the final part of the pulse train reaches the section 30 and represents the channel to be selected. The transmitter is thereby activated and the sound detected by the hydrophone, if any, is transmitted in the selected channel. Each tenth second the transmission of sound information is interrupted and instead the ID information is transmitted from the memory 17 in the special channel. During this ID transmission position determination of the actual listening device takes place. This continues until the master station again transmits the ID number of the actual device together with a signal which ends-up in the section 29 of the register 25, whereby the transmitter is de-activated.

FIG. 3 shows schematically the signal processing part of the receiver of the master station M1, which is concerned with determination of the position of a sound source relative to three selected listening devices. If the channels are frequency channels, i.e. a specific carrier or sub-carrier for each channel, the receiver part consists in principle of a number of bandpass filters each tuned to its frequency. In case of the channel subcarrier, each channel filter must be preceded by a filter and mixing stage for suppression of the main carrier. FIG. 3 shows the receiver channels for three selected listening devices represented by the band pass filters F1, F2 and F3 with associated detectors D1, D2 and D3. The detectors are each connected to an output 01, 02 and 03, where the low frequency modulation signals in the respective channel appear. At the outputs 01, 02 and 03 thus the same sound information appears but in different time positions dependent on different travel times for sound in the water to the respective listening device (the differences in travel time for the radio waves in the air is not taken into account). The signal processing is in principle effected such that the sound signals are correlated two and two for determining their mutual time difference. Thus, in FIG. 3 the signals at the outputs 01 and 02 are coupled via a switching network SW to a first correlator K1, while the signals at the outputs 01 and 03 via the switching network SW are led to a second correlator. The output of correlator K1 represents the time difference T1 and the output of correlator K2 represents the time difference T2. The time differences T1 and T2 each define a hyperbola, and the sound source U is situated in the cross-point between these hyperbolae.

FIG. 4 illustrates schematically how the position of the different listening devices can be determined, and shows the components in the master station required for localizing the portion of the first listening device A1 (FIG. 1). The localization of the listening devices is, as mentioned above, effected during the short interrupts in the sound transmission during which ID information is transmitted in a special channel. It is assumed that the device A1 is the only one to transmit ID information at a certain time moment. This information is transmitted as a pulse train in the assigned channel, i.e. on an assigned channel frequency, and is retransmitted by the selected relay stations M2 and M3 in two other channels. In order to separate these signals the master station contains three bandpass filters, a first filter F4 tuned to the channel frequency used by the listening device A1 (and also by remaining listening devices) for transmission of its ID information, and two filters F5 and F6 tuned to those channel frequencies to which the said frequency is converted in the relay station M2 and M3, respectively. The filters F4, F5 and F6 are each connected via one of detectors D4, D5, D6 to one of outputs 04, 05, 06. Thus, at these outputs one and the same ID information will appear, namely in the described example the ID-address for the listening device A1, but in different time positions. The signal processing for determining the position of the device A1 is in principle effected such that the ID signals at the said outputs are compared two and two after correction for the known travel times from M2 to M1 and from M3 to M1, respectively, for determining their mutual time difference when they reach the respective stations M1, M2 and M3. Thus, the signal at the first output 04 is coupled to a first input of a comparison device J1 via a time delay circuit B1 which delays the signal the known travel time $\tau 1$ from M2 to M1, while the signal at 05 is led directly to a second input of the comparison device J1. In corresponding manner the signal at the output 04 is coupled to a first input of a second comparison device J2 via a time delay circuit B2 which delays the signal the known travel time $\tau 2$ from M3 to M1, while the signal at the output 06 is coupled directly to a second input of J2. The comparison device J1 delivers an output signal representing a time difference T3, while J2 delivers a signal representing a time difference T4. The time differences T3 and T4 each define a hyperbola and A1 is situated in the cross-point between these hyperbolae. The time differences T3 and T4 or possibly the calculated position are stored together with the ID-number of the device A1.

At different succeeding time moments the corresponding information then will arrive from listening devices A2 and A3, which are localized in the same manner and with the same circuits. Each tenth second the ID-number from A1 arrives again and the stored information about the position of the device is continuously updated.

The operation of the whole system is as follows.

After placing the listening devices in their positions in a sea area containing a possible sound source and establishment of the stationary stations M1, M2 and M3, a general information collecting phase is first started to determine if there are reliable indications of a sound source within the supervised area and, if so, its approximate position. This information collecting phase may for example involve calling the listening devices and activating them in successive order. As soon as a listening device is activated it will transmit the detected sound and its ID-number, whereby the position of the station can be determined. The ID-number, position and a coarse information about the detected sound is stored. Now, if it turns out that a number of adjacent listening devices detect a sound exceeding a certain level and of similar character only these listening devices are activated and measuring of the position of the sound source is effected in described manner.

In order to optimize the information transmission in relation to required band width the sound signals can be digitized and channel separation be achieved by means of time multiplex. FIG. 5 shows a simplified block diagram for a listening device operating according to this principle. The listening devices (buoys) are assumed to co-operate with a number of stationary radio stations one of which, the master, comprises an accurate clock and transmits synchronization or adjusting pulses to all buoys and activation control orders to certain selected buoys. Each buoy has a receiver 100 and a transmitter 101. The receiver 100 is connected to an antenna 104 via two switches 102, 103 normally assuming the shown position. The transmitter 101 can be connected briefly to the antenna 104 via the same switches. To the output of the receiver 100 are connected three detectors, an ID-detector 105, a channel detector 106 and a synchronization detector 107. The synchronization detector 107 controls a clock 108, the output signal of which in combination with the output signal from the channel detector 106 being adapted to control a channel selection circuit 109. A memory 110 is continuously loaded with samples of the sound signal detected by a hydrophone 111, which samples are generated by means of an amplifier 112 and an A/D converter 113. The information in the memory 110 is led via a reading device 114 to the input of the transmitter 101. The memory 110 is zeroed by means of the signal from the synchronization detector 107, while the reading device 114 is activated from the channel selection circuit 109. This circuit also controls the switch 103, while the switch 102 is controlled by means of signal from the ID-detector 105.

The operation is as follows.

Order of regular time intervals, for example of the 0.1 seconds every 10 seconds, synchronization or adjusting pulses will arrive for zeroing the clocks in all buoys. These clocks therefore can have moderate accuracy and so be of inexpensive construction. With the assumed extended time intervals the difference in the travel time for the synchronization pulse to different buoys will be negligible and the clocks can be assumed to run in synchronism. At the same time the memory is zeroed, which memory has such a capacity that it can store all samples representing the sound signal in the whole time interval between two sync pulses. This time interval between two sync pulses is divided into a number of sub-intervals, for example ten, each representing a channel having a length of 0.01 seconds. To each sub-interval is associated a channel number 1, 2 . . . 10. When the master wants a certain buoy to transmit its detected sound it first transmits the ID-number of the buoy immediately followed by a signal representing an activation order. The ID detector 105 in the buoy reacts and sets the switch 102 to the opposite position as compared with the shown one, and the buoy is activated for transmission. Immediately thereafter the master station transmits a pulse sequence representing the channel number to allot to the buoy. This pulse sequence is detected by the channel detector 106 controlling the channel selection circuit 109 so that this circuit 109 delivers a signal a number of subintervals after a sync pulse, which number is equal to the channel number. The signal from the circuit 109 sets the switch 103 to the opposite position as compared with the shown one and initiates a reading device 114. When the reading device 114 receives a control signal the memory 110 is scanned with high speed and the sampled sound signal is transmitted in compressed form via the antenna 104 by modulation on a radio carrier in the actual time channel. The same procedure is then repeated for another buoy in another channel. In the master station and the remaining stationary stations the relationship of the channel/ID-number is stored. Therefore the stored sequencies representing the sound signals detected by the different buoys can be shifted in time with account being taken of the time positions of the different channels and correlation being effected in the manner described previously. If desired, further shifting can be effected for making correction of time errors arising due to the different travel time of the sync pulse to different buoys.

Instead of selective individual activation, as in the described embodiments, it is alternatively possible to activate the listening devices group-wise, for example in dependence on their geographical position, as described in the Swedish patent application no. 8301019-9.

If stationary listening devices are present in vicinity of the area to be monitored it is also possible to use these devices in combination with one or several of the free-floating buoys by providing them with radio transmitters.

What is claimed is:

1. A method for locating a sound source in a water area, such method being for use in a system comprising:
    at least three listening devices each provided with a hydrophone and a radio transmitter;
    a radio master station to which signals indicating detection of sounds by the listening devices are transmitted and which determines the geographical position of the sound source by correlating the times of reception of such sound detection signals;
    and at least two relay stations at fixed geographical positions relative to said master station; such method comprising the steps of:
    transmission by each of the listening devices, alternatively, of radio signals identifying such devices, such identifying signals being received by the master station and the relay stations;
    transmission by each of the listening devices, in respective radio channels, of said sound detection signals;
    the relay stations relaying the identifying signals received thereby to the master station;
    the master station processing the identifying signals received thereby directly from the listening devices and relayed from the relay stations to determine, from the relative times of reception of such signals, the geographical position of each of said listening devices;
    and the master station processing the sound detection signals received from each of the listening devices to determine the geographical position of the sound source with respect to said determined geographical positions of the listening devices, such processing being effected by correlating the relative times of reception of said sound detection signals.

2. A method for locating a sound source as claimed in claim 1, wherein said system comprises more than three of said listening devices, such method further characterized in that said master station transmits control signals to the listening devices which, upon reception by the listening devices, selectively actuates the radio transmitters of particular ones of the listening devices.

3. In a system for locating a sound source in a water area, said system comprising:
    at least three listening devices each provided with a hydrophone and a radio transmitter for transmitting signals signifying detection of sounds by such hydrophone;
    and a radio master station for receiving signals transmitted by said listening devices, said master station comprising means for correlating the reception times of sound detection signals form such devices to determine the position of said sound source;

the improvement characterized in that the radio transmitters of the respective listening devices transmit said sound detection signals in respective radio channels, and in that said system further comprises:

at least two relay stations at fixed geographical positions for relaying signals received thereby from the listening devices to the master station;

switching means comprised in each of said listening devices for alternatively applying to the radio transmitter thereof a signal which individually identifies such listening device and a signal signifying detection by the hydrophone of said device of sound from said sound source;

and processing means in said master station responsive to said identifying signals received by the master station directly from the listening devices and relayed thereto from said relay stations to determine the geographical positions of said listening devices.

4. A system as claimed in claim 3, wherein said system comprises more than three of said listening devices, characterized in that said master station comprises a transmitter for transmitting control signals to the listening devices and the listening devices each comprise activation control means responsive to such control signals to selectively activate the radio transmitters of particular ones of said listening devices.

* * * * *